(12) United States Patent
Garel et al.

(10) Patent No.: US 7,227,741 B2
(45) Date of Patent: Jun. 5, 2007

(54) COMPOSITE COVER FOR NOTEBOOK-TYPE COMPUTER

(75) Inventors: Michael R. Garel, Austin, TX (US); Ronald P. Langerhans, Austin, TX (US); Yu Li Liao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 10/966,452

(22) Filed: Oct. 15, 2004

(65) Prior Publication Data

US 2006/0082956 A1   Apr. 20, 2006

(51) Int. Cl.
 *G06F 1/16* (2006.01)
(52) U.S. Cl. ...................... 361/681; 361/683
(58) Field of Classification Search ............... 361/681, 361/683, 679
See application file for complete search history.

(56) References Cited

U.S. PATENT DOCUMENTS

| 5,992,155 | A | 11/1999 | Kobayashi et al. ........... 62/3.7 |
| 6,125,033 | A * | 9/2000 | Andre et al. ................. 361/683 |
| 6,507,484 | B2 * | 1/2003 | Fukuyoshi ................... 361/681 |
| 6,778,196 | B2 | 8/2004 | Nakamura ................... 345/905 |
| 2001/0009498 | A1 * | 7/2001 | Oross et al. ................. 361/681 |
| 2002/0144032 | A1 | 10/2002 | Kriege et al. ................. 710/62 |

* cited by examiner

*Primary Examiner*—Yean-Hsi Chang
(74) *Attorney, Agent, or Firm*—Baker Botts L.L.P.

(57) ABSTRACT

A cover for a notebook type computer, and a method of making same. The cover comprises a stiff metal body covered by a cosmetic shell. The body and shell are adhered together to form a composite cover. All force bearing elements, such as hinges and latches, are attached to the body, such that the shell need not endure applied force during use of the computer.

19 Claims, 4 Drawing Sheets

| COVER TYPE | MAX DEFORMATION | |
|---|---|---|
| COVER 107 0.8mm Al 1.5mm PC+ABS | 5.54mm | 0.96 |
| CONVENTIONAL COVER 1.4mm Mg/Al | 5.80mm | 1 |

COMPOSITE COVER FOR NOTEBOOK-TYPE COMPUTER

TECHNICAL FIELD

This invention relates to enclosures for information handling systems such as notebook and laptop computers, and more particularly to a cover for such computers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers are a type of portable information handling system. Notebook computers characterized by their compact flat shape. They are typically small enough to fit in a briefcase. In addition to their size and portability, a difference between a notebook computer and a personal computer is the display screen computers use a variety of techniques, known as flat-panel technologies, to produce a lightweight and non-bulky display screen.

For a notebook computer, the display screen is placed on the inner surface of a hinged cover. The cover is hinged to the housing for the CPU, memory, and other computer hardware. The keyboard and other input mechanisms are placed on the top surface of this housing, such that the cover may be opened and tilted upward to expose the screen inside the cover and the keyboard atop the housing.

SUMMARY

In accordance with teachings of the present disclosure, a system and method are described for a cover for a notebook-type information handling system. For a notebook-type information handling system, it is assumed that the cover has a hinged attachment to a lower portion of the information handling system.

The cover comprises a rigid body, to which the hinge attachment means are attached. A cosmetic shell has a shape that is generally conformal over the body. The shell is adhered to the top surface of the body, thereby forming a composite structure. Like the hinges, all structural elements to which force may be applied, are attached to the rigid body, not to the shell.

The cover provides a low cost alternative to other covers, and provides equal or better functionality. The primary function of the body is structural, to provide strength and protection for the information handling system. The primary purpose of the shell is to simply provide an attractive appearance.

Because the body is not visible, minor cosmetic defects in the body are not important, and manufacturing yields are higher. The shell provides an attractive appearance, and eliminates the need for cleaning, reworking, priming, and painting processes associated with conventional metal-type notebook computer covers.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figures 1, 5:
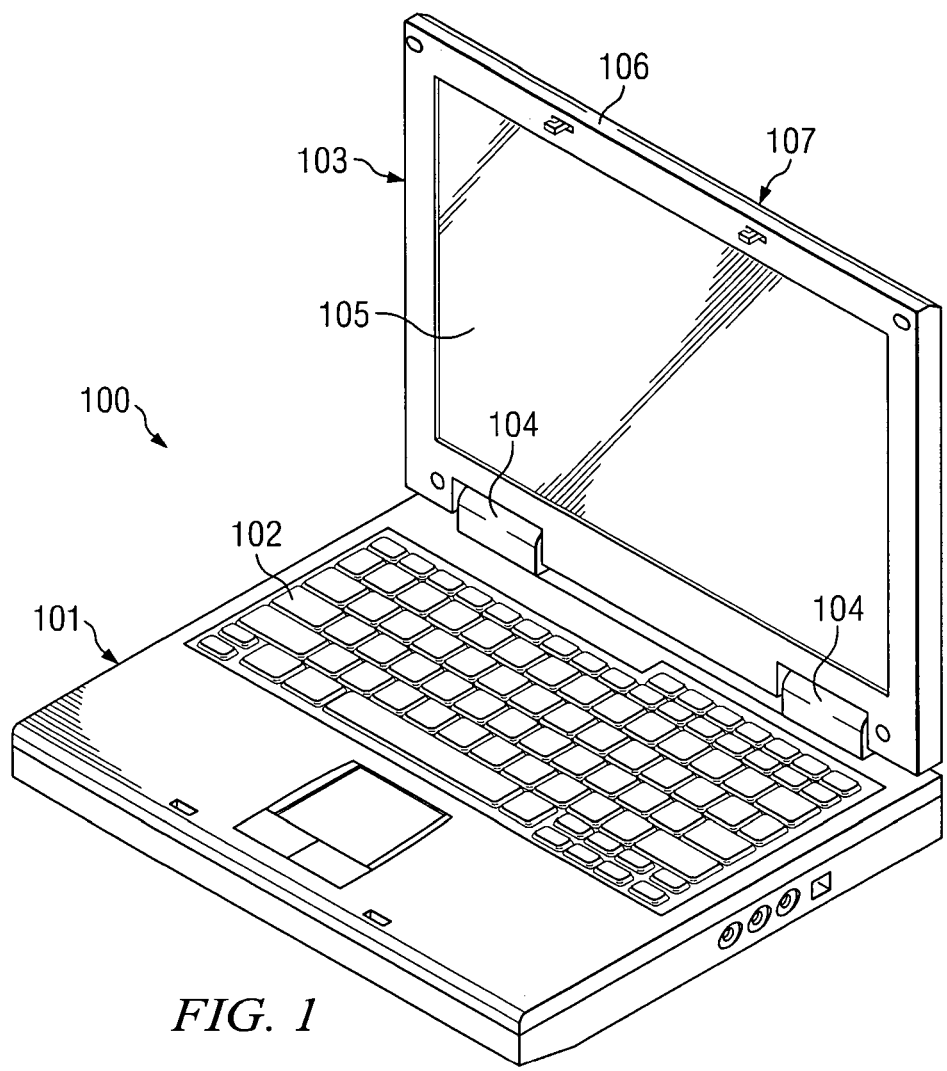
FIG. 1 illustrates a typical notebook-type information handling system.
FIG. 5 is a chart illustrating the comparative strength of the cover versus a conventional cover.

FIG. 1 is a perspective view of a notebook computer 100. Another type of small portable computer is a laptop computer. Technically, notebook computers are smaller than laptop computers. However, today, most laptop computers have been downsized to be notebook computers. For purposes of this description, the two terms are used synonymously.

Thus, although this description is in terms of a notebook computer, the term is used in its most general sense to include laptop computers, or any information handling system having a generally flat rectangular shape, a hinged flip-up cover, and its display mounted in the cover.

As stated in the Background, computer 100 has a bottom portion 101, which contains the processing elements (not shown) and has various input devices (such as keyboard 102) mounted on its surface. Top portion 103 is attached by means of hinges 104 to the bottom portion 101. Display screen 105 is mounted on the inside surface of the top portion 103. It is attached to cover 106 by means of a facing 107.

Cover 107 serves as the top outer surface of computer 100. As explained below, cover 107 is made from two main pieces, that is, a high strength rigid body covered by a cosmetic shell.

Figure 2:
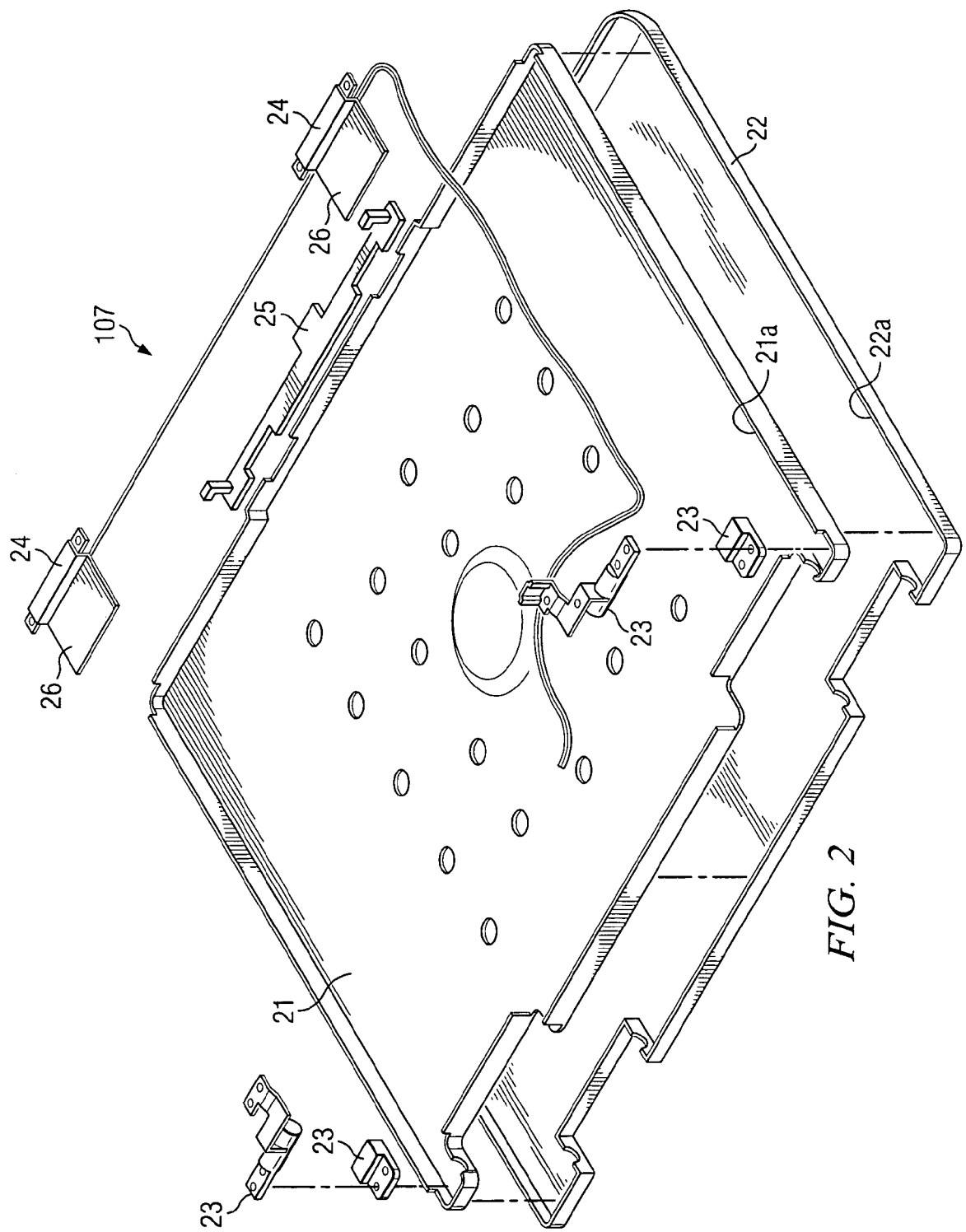
FIG. 2 is an exploded view of a cover in accordance with the invention.

FIG. 2 is an exploded view of cover 107, showing body 21 and cosmetic shell 22. Both body 21 and shell 22 have a generally flat planar shape. Shell 22 is molded or otherwise formed so as to be generally conformal to the top surface of body 21. In other words, shell 22 has a generally flat planar shape and is easily placed atop body 21.

Body 21 has a lip 21a that generally matches the thickness of display 105 (not shown in FIG. 2). Shell 22 typically has a lip 22a that substantially covers lip 21a.

Typically, body 21 is manufactured by means of a drawing process. By "drawn" is meant a process of molding metal by rolling or pulling through a die.

An example of a suitable material is aluminum. However, other high strength rigid materials may be used. The primary function of body 21 is to provide structural strength to protect display 105 and other internal components of notebook computer 100.

A feature of the invention is that because body 21 is not visible under shell 22, body 21 need not satisfy cosmetic requirements. In other words, the drawing process used to make body 21 may result in defects that are acceptable for structural requirements, but might not be acceptable if the body 21 were not to be covered by shell 22. This results in higher manufacturing yields for body 21, than for covers of other notebook computers that use drawn metals.

Shell 22 is typically made from a plastic material. The function of shell 22 is as a cosmetic surface for body 21, and it need not provide structural strength. The material may be low cost, and the manufacturing process may be simple, such as a molding process.

Shell 22 need only provide an attractive appearance over body 21. It may be rigid or flexible. Another example of a suitable material is fiberglass.

Furthermore, shell 22 absorbs no force applied to cover 107. All structural elements to which force may be applied are attached to body 21. For example, forces applied by opening and closing body 21 are applied via hinges 23 (shown in exploded view), which are attached to body 21. Plates 24 or other means for attaching display 105 (not shown in FIG. 2) are attached to body 21. Similarly, latch 25 is attached to body 21, as is the electrical connection 26 for display 105. Forces normally occurring during use of computer 100 are applied to body 21 and not to shell 22.

Figure 3:
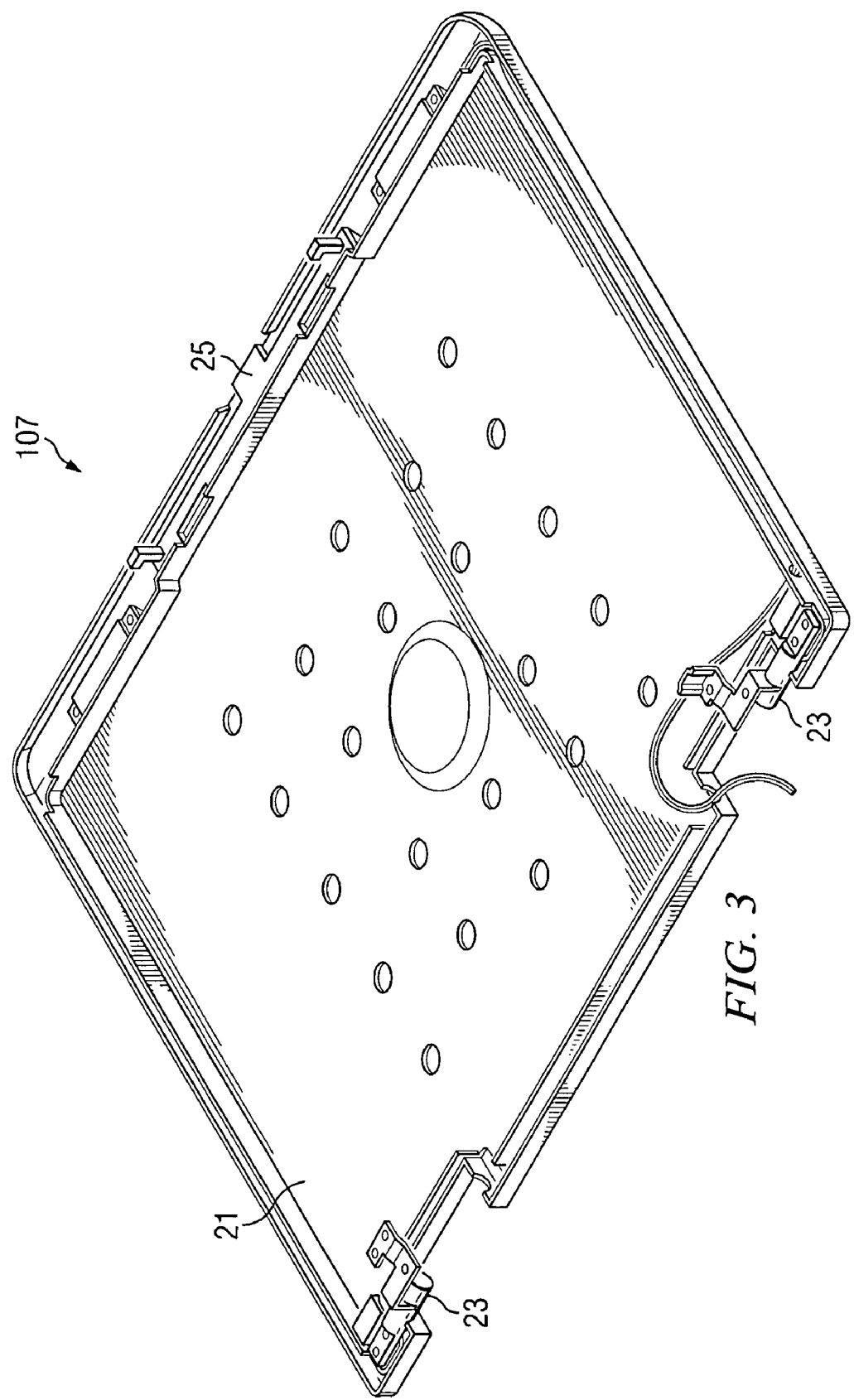
FIG. 3 is a perspective view of the bottom surface of the cover, prior to attachment of the display.
Figure 4:
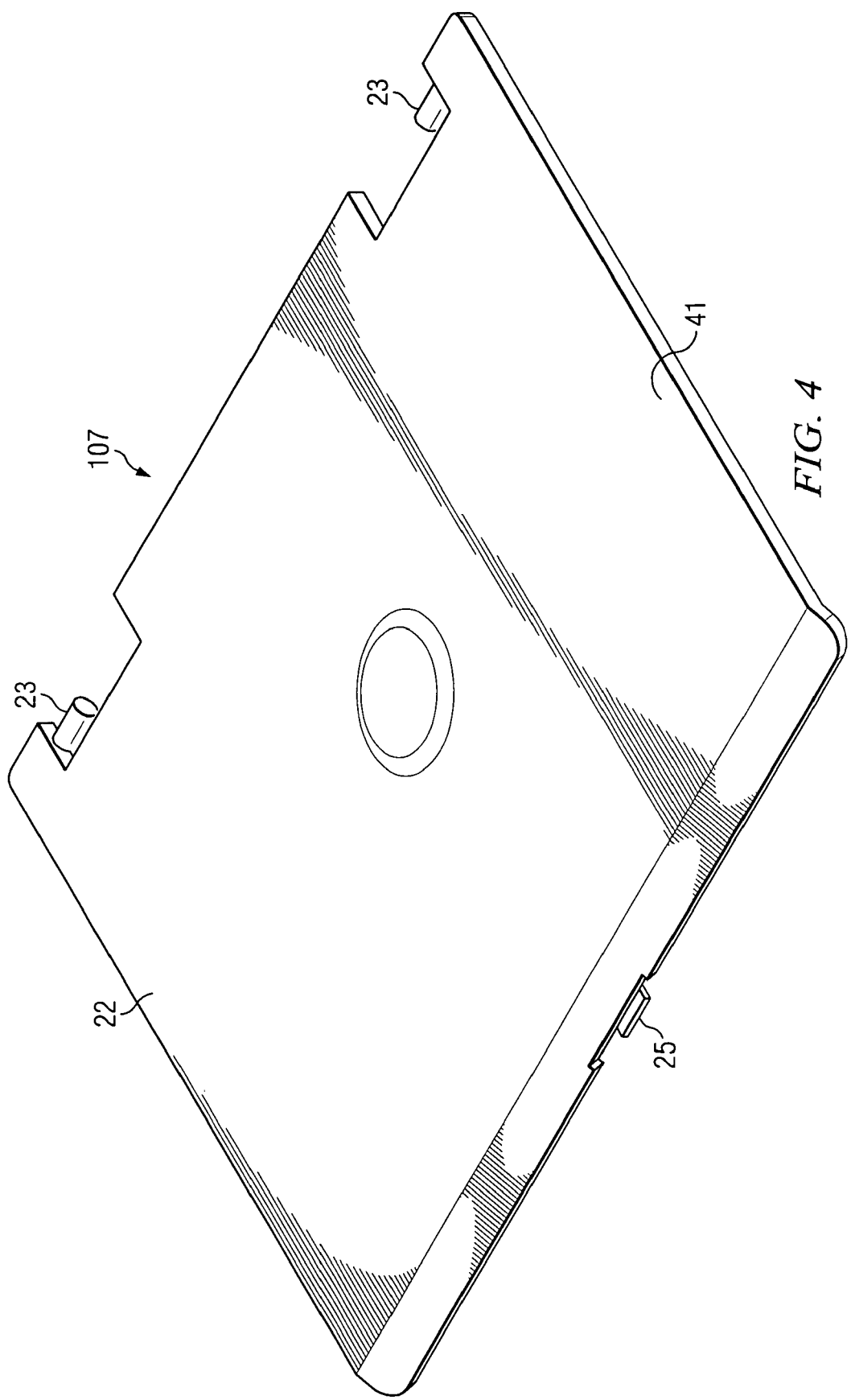
FIG. 4 is a perspective view of the top surface of the cover.

FIGS. 3 and 4 are an inner view and outer view, respectively, of cover 107. Body 21 and shell 22 are adhered or otherwise firmly attached to each other, such that the top surface of body 21 is conforms against the bottom surface of shell 22. Together, they form a rigid composite cover 107.

Referring especially to FIG. 4, logos or other design or enterprise marking insignia can be easily attached to the outer surface of shell 22. The external appearance of cover 107 is dependent on shell 22 and not on body 21.

FIG. 5 is a chart that compares an example of cover 107 to a conventional metal cover. In the example of FIG. 5, body 21 is made from aluminum, having a thickness of 0.8 mm. Shell 22 is made from plastic, having a thickness of 1.5 mm. A suitable plastic is polycarbonate (PC) combined with a plastic based on acrylonitrile-butadiene-styrene copolymers (ABS). For purpose of this description, a "plastic" is a generic name for certain synthetic or semi synthetic materials that can be molded or extruded into objects, such as shell 22.

Cover 107 is compared to a conventional cover (not shown) made from magnesium and aluminum and having a thickness of 1.4 mm.

Both cover 107 and the conventional cover were subjected to FEA (finite element analysis) deformation testing. As indicated the maximum deformation of cover 107 was 5.54 mm, whereas the maximum deformation of the conventional cover was 5.80 mm. The deformation ratios were 0.96 and 1 respectively. Thus, cover 107 compares favorably to conventional covers in terms of strength and stiffness.

Although the disclosed embodiments have been described in detail, it should be understood that various changes, substitutions and alterations can be made to the embodiments without departing from their spirit and scope.

What is claimed is:

1. A cover for a notebook-type information handling system, the information handling system also having a bottom portion, comprising:
   a display screen;
   a rigid body having means for attaching the display screen to the inner surface of the rigid body;
   at least one hinge for attaching the rigid body to the bottom portion;
   a cosmetic shell, the shell having a shape that is generally conformal over the body;
   wherein the shell is adhered to the top surface of the body, thereby forming a composite structure operable to close against the bottom portion by means of the hinge
   wherein the rigid body has a lip for enclosing the display screen and wherein the shell has a lip that overlaps the lip of the rigid body, such that the entire top surface and outer side surfaces of the rigid body substantially conform in shape against the bottom surface and inner side surfaces of the shell; and
   a latch attached to the rigid body operable to close the composite structure against the bottom portion.

2. The cover of claim 1, wherein the body is made from a metal.

3. The cover of claim 1, wherein the body is made from aluminum.

4. The cover of claim 1, wherein the body is drawn aluminum.

5. The cover of claim 1, wherein the shell is adhered to the body by means of glue.

6. The cover of claim 1, wherein the shell is made from a plastic material.

7. The cover of claim 1, wherein the shell is made from a fiberglass material.

8. The cover of claim 1, wherein the body has a thickness of less than one millimeter.

9. A method of making a cover for a notebook-type information handling system, the cover having hinged attachment means to a lower portion of the information handling system, the method comprising:

forming a rigid body;

attaching the hinged attachment means to the body;

attaching a display to the inner surface of the body;

forming a cosmetic shell, the shell having a shape that is generally conformal over the body;

adhering the shell to the top surface of the body, thereby forming a composite structure operable to close against the bottom portion by means of the hinged attachment means;

wherein the rigid body has a lip for enclosing the display screen and wherein the shell has a lip that overlaps the lip of the rigid body, such that the entire top surface and outer side surfaces of the rigid body substantially conform in shape against the bottom surface and inner side surfaces of the shell; and attaching a latch to the rigid body operable to close the composite structure against the bottom portion.

10. The method of claim 9, wherein the body is made from a metal.

11. The method of claim 9, wherein the body is made from aluminum.

12. The method of claim 9, wherein the body is drawn aluminum.

13. The method of claim 9, wherein the adhering step is performed using a glue.

14. The method of claim 9, wherein the shell is made from a plastic material.

15. The method of claim 9, wherein the shell is made from a fiberglass material.

16. The method of claim 9, wherein the body has a thickness of less than one millimeter.

17. The cover of claim 1, wherein the entire top surface of the rigid shell is adhered to the entire bottom surface of the shell.

18. The cover of claim 1, wherein the entire outer surface of the lip of the rigid body is adhered to the entire inner surface of the lip of the shell.

19. The cover of claim 1, wherein the shell covers the rigid body, such that the rigid body is not visible.

* * * * *